(12) United States Patent
Koenigs et al.

(10) Patent No.: US 9,823,347 B1
(45) Date of Patent: Nov. 21, 2017

(54) WEATHER RADAR SYSTEM AND METHOD FOR HIGH ALTITUDE CRYSTAL WARNING INTERFACE

(71) Applicants: Gregory J. Koenigs, Cedar Rapids, IA (US); Jeffery A. Finley, Cedar Rapids, IA (US)

(72) Inventors: Gregory J. Koenigs, Cedar Rapids, IA (US); Jeffery A. Finley, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 471 days.

(21) Appl. No.: 14/207,034

(22) Filed: Mar. 12, 2014

(51) Int. Cl.
*G01S 13/95* (2006.01)
*B64D 15/20* (2006.01)

(52) U.S. Cl.
CPC ............ *G01S 13/953* (2013.01); *B64D 15/20* (2013.01)

(58) Field of Classification Search
CPC .............................. G01S 13/953; B64D 15/20
USPC .............................................. 342/26 R–26 D
See application file for complete search history.

(56) References Cited

U.S. PATENT DOCUMENTS

| | | | |
|---|---|---|---|
| 650,275 A | 5/1900 | Reeve | |
| 3,251,057 A | 5/1966 | Buehler et al. | |
| 3,359,557 A | 12/1967 | Fow et al. | |
| 3,404,396 A | 10/1968 | Buchler et al. | |
| 3,465,339 A | 9/1969 | Marner | |
| 3,491,358 A | 1/1970 | Hicks | |
| 3,508,259 A | 4/1970 | Andrews | |
| 3,540,829 A | 11/1970 | Collinson et al. | |
| 3,567,915 A | 3/1971 | Altshuler et al. | |
| 3,646,555 A | 2/1972 | Atlas | |
| 3,715,748 A | 2/1973 | Hicks | |
| 3,764,719 A | 10/1973 | Dell | |
| 3,781,530 A | 12/1973 | Britland et al. | |
| 3,781,878 A | 12/1973 | Kirkpatrick | |
| 3,803,609 A | 4/1974 | Lewis et al. | |
| 3,885,237 A | 5/1975 | Kirkpatrick | |
| 3,943,511 A | 3/1976 | Evans et al. | |
| 3,964,064 A | 6/1976 | Brandao et al. | |
| 3,968,490 A | 7/1976 | Gostin | |
| 4,015,257 A | 3/1977 | Fetter | |
| 4,043,194 A | 8/1977 | Tanner | |
| 4,223,309 A | 9/1980 | Payne | |
| 4,283,715 A | 8/1981 | Choisnet | |
| 4,283,725 A | 8/1981 | Chisholm | |

(Continued)

FOREIGN PATENT DOCUMENTS

| | | |
|---|---|---|
| EP | 1 329 738 B1 | 7/2003 |
| FR | 2658617 A1 | 8/1991 |

(Continued)

OTHER PUBLICATIONS

U.S. Appl. No. 13/246,769, filed Sep. 27, 2011, Rockwell Collins.

(Continued)

*Primary Examiner* — Marcus Windrich
(74) *Attorney, Agent, or Firm* — Donna Suchy

(57) ABSTRACT

A hazard warning system can be utilized in an aircraft. The hazard warning system can include a processing system for determining a high altitude ice crystal (HAIC) condition and causing a warning of the HAIC condition to be displayed. An avionic display can be used to display the warning of the HAIC condition.

20 Claims, 4 Drawing Sheets

(56) References Cited

U.S. PATENT DOCUMENTS

| | | | |
|---|---|---|---|
| 4,318,100 A | 3/1982 | Shimizu et al. |
| 4,346,595 A | 8/1982 | Frosch et al. |
| 4,430,654 A | 2/1984 | Kupfer |
| 4,435,707 A | 3/1984 | Clark |
| 4,459,592 A | 7/1984 | Long |
| 4,533,915 A | 8/1985 | Lucchi et al. |
| 4,555,703 A | 11/1985 | Cantrell |
| 4,600,925 A | 7/1986 | Alitz et al. |
| 4,613,937 A | 9/1986 | Batty, Jr. |
| 4,613,938 A | 9/1986 | Hansen et al. |
| 4,649,388 A | 3/1987 | Atlas |
| 4,658,255 A | 4/1987 | Nakamura et al. |
| 4,684,950 A | 8/1987 | Long |
| 4,742,353 A | 5/1988 | D'Addio et al. |
| 4,761,650 A | 8/1988 | Masuda et al. |
| 4,835,536 A | 5/1989 | Piesinger et al. |
| RE33,152 E | 1/1990 | Atlas |
| 4,914,444 A | 4/1990 | Pifer et al. |
| 4,928,131 A | 5/1990 | Onozawa |
| 4,940,987 A | 7/1990 | Frederick |
| 5,036,334 A | 7/1991 | Henderson et al. |
| 5,049,886 A | 9/1991 | Seitz et al. |
| 5,057,820 A | 10/1991 | Markson et al. |
| 5,077,558 A | 12/1991 | Kuntman |
| 5,105,191 A | 4/1992 | Keedy |
| 5,159,407 A | 10/1992 | Churnside et al. |
| 5,164,731 A | 11/1992 | Borden et al. |
| 5,173,704 A | 12/1992 | Buehler et al. |
| 5,177,487 A | 1/1993 | Taylor et al. |
| 5,198,819 A | 3/1993 | Susnjara |
| 5,202,690 A | 4/1993 | Frederick |
| 5,208,600 A | 5/1993 | Rubin |
| 5,221,924 A | 6/1993 | Wilson, Jr. |
| 5,262,773 A | 11/1993 | Gordon |
| 5,291,208 A | 3/1994 | Young |
| 5,296,865 A | 3/1994 | Lewis |
| 5,311,183 A | 5/1994 | Mathews et al. |
| 5,311,184 A | 5/1994 | Kuntman |
| 5,331,330 A | 7/1994 | Susnjara |
| 5,396,220 A | 3/1995 | Markson et al. |
| 5,402,116 A | 3/1995 | Ashley |
| 5,469,168 A | 11/1995 | Anderson |
| 5,479,173 A | 12/1995 | Yoshioka et al. |
| 5,485,157 A | 1/1996 | Long |
| 5,517,193 A | 5/1996 | Allison et al. |
| 5,521,603 A | 5/1996 | Young |
| 5,534,868 A | 7/1996 | Gjessing et al. |
| 5,568,151 A | 10/1996 | Merritt |
| 5,583,972 A | 12/1996 | Miller |
| 5,592,171 A | 1/1997 | Jordan |
| 5,602,543 A | 2/1997 | Prata et al. |
| 5,615,118 A | 3/1997 | Frank |
| 5,648,782 A | 7/1997 | Albo et al. |
| 5,654,700 A | 8/1997 | Prata et al. |
| 5,657,009 A | 8/1997 | Gordon |
| 5,686,919 A | 11/1997 | Jordan et al. |
| 5,726,656 A | 3/1998 | Frankot |
| 5,757,322 A | 5/1998 | Ray et al. |
| 5,771,020 A | 6/1998 | Markson et al. |
| 5,828,332 A | 10/1998 | Frederick |
| 5,838,239 A | 11/1998 | Stern et al. |
| 5,839,080 A | 11/1998 | Muller et al. |
| 5,907,568 A * | 5/1999 | Reitan, Jr. ............. G01S 7/22 342/181 |
| 5,920,276 A | 7/1999 | Frederick |
| 5,945,926 A | 8/1999 | Ammar et al. |
| 5,973,635 A | 10/1999 | Albo |
| 6,034,760 A | 3/2000 | Rees |
| 6,043,756 A | 3/2000 | Bateman et al. |
| 6,043,757 A | 3/2000 | Patrick |
| 6,081,220 A | 6/2000 | Fujisaka et al. |
| 6,138,060 A | 10/2000 | Conner et al. |
| 6,154,151 A | 11/2000 | McElreath et al. |
| 6,154,169 A | 11/2000 | Kuntman |
| 6,177,873 B1 | 1/2001 | Cragun |
| 6,184,816 B1 | 2/2001 | Zheng et al. |
| 6,201,494 B1 | 3/2001 | Kronfeld |
| 6,208,284 B1 | 3/2001 | Woodell et al. |
| 6,236,351 B1 | 5/2001 | Conner et al. |
| 6,240,369 B1 | 5/2001 | Foust |
| 6,246,367 B1 | 6/2001 | Markson et al. |
| 6,281,832 B1 | 8/2001 | McElreath |
| 6,289,277 B1 | 9/2001 | Feyereisen et al. |
| 6,297,772 B1 | 10/2001 | Lewis |
| 6,339,747 B1 | 1/2002 | Daly et al. |
| 6,340,946 B1 | 1/2002 | Wolfson et al. |
| 6,377,202 B1 * | 4/2002 | Kropfli ............. G01S 7/024 342/175 |
| 6,381,538 B1 | 4/2002 | Robinson et al. |
| 6,388,607 B1 | 5/2002 | Woodell |
| 6,388,608 B1 | 5/2002 | Woodell et al. |
| RE37,725 E | 6/2002 | Yamada |
| 6,405,134 B1 | 6/2002 | Smith et al. |
| 6,424,288 B1 | 7/2002 | Woodell |
| 6,441,773 B1 | 8/2002 | Kelly et al. |
| 6,456,226 B1 | 9/2002 | Zheng et al. |
| 6,480,142 B1 | 11/2002 | Rubin |
| 6,496,252 B1 | 12/2002 | Whiteley |
| 6,501,392 B2 | 12/2002 | Gremmert et al. |
| 6,512,476 B1 | 1/2003 | Woodell |
| 6,518,914 B1 | 2/2003 | Peterson et al. |
| 6,549,161 B1 | 4/2003 | Woodell |
| 6,560,538 B2 | 5/2003 | Schwinn et al. |
| 6,563,452 B1 | 5/2003 | Zheng et al. |
| 6,577,947 B1 | 6/2003 | Kronfeld et al. |
| 6,590,520 B1 | 7/2003 | Steele et al. |
| 6,597,305 B2 | 7/2003 | Szeto et al. |
| 6,603,425 B1 | 8/2003 | Woodell |
| 6,606,564 B2 | 8/2003 | Schwinn et al. |
| 6,614,382 B1 | 9/2003 | Cannaday et al. |
| 6,650,275 B1 | 11/2003 | Kelly et al. |
| 6,650,972 B1 | 11/2003 | Robinson et al. |
| 6,667,710 B2 | 12/2003 | Cornell et al. |
| 6,670,908 B2 | 12/2003 | Wilson et al. |
| 6,677,886 B1 | 1/2004 | Lok |
| 6,683,609 B1 | 1/2004 | Baron et al. |
| 6,690,317 B2 | 2/2004 | Szeto et al. |
| 6,703,945 B2 | 3/2004 | Kuntman et al. |
| 6,720,906 B2 | 4/2004 | Szeto et al. |
| 6,738,010 B2 | 5/2004 | Steele et al. |
| 6,741,203 B1 | 5/2004 | Woodell |
| 6,744,382 B1 | 6/2004 | Lapis et al. |
| 6,771,207 B1 | 8/2004 | Lang |
| 6,788,043 B2 | 9/2004 | Murphy et al. |
| 6,791,311 B2 | 9/2004 | Murphy et al. |
| 6,828,922 B1 | 12/2004 | Gremmert et al. |
| 6,828,923 B2 | 12/2004 | Anderson |
| 6,839,018 B2 | 1/2005 | Szeto et al. |
| 6,850,185 B1 | 2/2005 | Woodell |
| 6,856,908 B2 | 2/2005 | Devarasetty et al. |
| 6,879,280 B1 | 4/2005 | Bull et al. |
| 6,882,302 B1 | 4/2005 | Woodell et al. |
| 6,917,860 B1 | 7/2005 | Robinson et al. |
| 6,977,608 B1 | 12/2005 | Anderson et al. |
| 7,030,805 B2 | 4/2006 | Ormesher et al. |
| 7,042,387 B2 | 5/2006 | Ridenour et al. |
| 7,082,382 B1 | 7/2006 | Rose et al. |
| 7,109,912 B1 * | 9/2006 | Paramore ............. G01S 13/86 342/176 |
| 7,109,913 B1 | 9/2006 | Paramore et al. |
| 7,116,266 B1 | 10/2006 | Vesel et al. |
| 7,129,885 B1 | 10/2006 | Woodell et al. |
| 7,132,974 B1 | 11/2006 | Christianson |
| 7,139,664 B2 | 11/2006 | Kelly et al. |
| 7,145,503 B2 | 12/2006 | Abramovich et al. |
| 7,161,525 B1 * | 1/2007 | Finley ............. G01S 7/062 342/179 |
| 7,200,491 B1 | 4/2007 | Rose et al. |
| 7,205,928 B1 | 4/2007 | Sweet |
| 7,242,343 B1 * | 7/2007 | Woodell ............. G01S 7/41 342/26 B |
| 7,259,714 B1 | 8/2007 | Cataldo |
| 7,292,178 B1 | 11/2007 | Woodell et al. |
| 7,307,576 B1 | 12/2007 | Koenigs |

(56) References Cited

U.S. PATENT DOCUMENTS

| | | |
|---|---|---|
| 7,307,577 B1 | 12/2007 | Kronfeld et al. |
| 7,307,583 B1 | 12/2007 | Woodell et al. |
| 7,307,586 B2 | 12/2007 | Peshlov et al. |
| 7,307,756 B2 | 12/2007 | Walmsley |
| 7,352,317 B1 | 4/2008 | Finley et al. |
| 7,352,929 B2 | 4/2008 | Hagen et al. |
| 7,365,674 B2 | 4/2008 | Tillotson et al. |
| 7,372,394 B1* | 5/2008 | Woodell ............... G01S 7/292 342/26 B |
| 7,383,131 B1 | 6/2008 | Wey et al. |
| 7,417,578 B1 | 8/2008 | Woodell et al. |
| 7,417,579 B1 | 8/2008 | Woodell |
| 7,427,943 B1 | 9/2008 | Kronfeld et al. |
| 7,436,361 B1 | 10/2008 | Paulsen et al. |
| 7,471,995 B1 | 12/2008 | Robinson |
| 7,486,219 B1 | 2/2009 | Woodell et al. |
| 7,486,220 B1 | 2/2009 | Kronfeld et al. |
| 7,492,304 B1* | 2/2009 | Woodell ............... G01S 7/285 342/175 |
| 7,492,305 B1 | 2/2009 | Woodell et al. |
| 7,515,087 B1 | 4/2009 | Woodell et al. |
| 7,515,088 B1 | 4/2009 | Woodell et al. |
| 7,528,613 B1 | 5/2009 | Thompson et al. |
| 7,541,971 B1 | 6/2009 | Woodell et al. |
| 7,557,735 B1 | 7/2009 | Woodell et al. |
| 7,576,680 B1 | 8/2009 | Woodell |
| 7,581,441 B2 | 9/2009 | Barny et al. |
| 7,598,901 B2 | 10/2009 | Tillotson et al. |
| 7,598,902 B1 | 10/2009 | Woodell et al. |
| 7,633,428 B1 | 12/2009 | McCusker et al. |
| 7,633,431 B1 | 12/2009 | Wey et al. |
| 7,664,601 B2 | 2/2010 | Daly, Jr. |
| 7,696,921 B1 | 4/2010 | Finley et al. |
| 7,714,767 B1 | 5/2010 | Kronfeld et al. |
| 7,728,758 B2 | 6/2010 | Varadarajan et al. |
| 7,733,264 B1 | 6/2010 | Woodell et al. |
| 7,859,448 B1 | 12/2010 | Woodell et al. |
| 7,868,811 B1* | 1/2011 | Woodell ............... G01S 7/22 342/175 |
| 7,917,255 B1 | 3/2011 | Finley |
| 7,932,853 B1 | 4/2011 | Woodell et al. |
| 7,973,698 B1 | 7/2011 | Woodell et al. |
| 7,982,658 B2 | 7/2011 | Kauffman et al. |
| 8,022,859 B2 | 9/2011 | Bunch et al. |
| 8,054,214 B2 | 11/2011 | Bunch |
| 8,072,368 B1 | 12/2011 | Woodell |
| 8,081,106 B2 | 12/2011 | Yannone |
| 8,089,391 B1 | 1/2012 | Woodell et al. |
| 8,098,188 B2 | 1/2012 | Costes et al. |
| 8,098,189 B1 | 1/2012 | Woodell et al. |
| 8,111,186 B2 | 2/2012 | Bunch et al. |
| 8,159,369 B1 | 4/2012 | Koenigs et al. |
| 8,217,828 B2 | 7/2012 | Kirk |
| 8,228,227 B2 | 7/2012 | Bunch et al. |
| 8,314,730 B1 | 11/2012 | Musiak et al. |
| 8,332,084 B1 | 12/2012 | Bailey et al. |
| 8,902,100 B1 | 12/2014 | Woodell et al. |
| 9,019,146 B1 | 4/2015 | Finley et al. |
| 2002/0039072 A1 | 4/2002 | Gremmert et al. |
| 2002/0126039 A1 | 9/2002 | Dalton et al. |
| 2003/0001770 A1 | 1/2003 | Cornell et al. |
| 2003/0025627 A1 | 2/2003 | Wilson et al. |
| 2003/0117311 A1* | 6/2003 | Funai ............... G01S 13/26 342/26 R |
| 2003/0193411 A1 | 10/2003 | Price |
| 2004/0183695 A1 | 9/2004 | Ruokangas et al. |
| 2004/0239550 A1 | 12/2004 | Daly, Jr. |
| 2005/0049789 A1 | 3/2005 | Kelly et al. |
| 2005/0174350 A1 | 8/2005 | Ridenour et al. |
| 2006/0036366 A1 | 2/2006 | Kelly et al. |
| 2007/0005249 A1 | 1/2007 | Dupree et al. |
| 2007/0152867 A1 | 7/2007 | Randall |
| 2008/0158049 A1 | 7/2008 | Southard et al. |
| 2009/0177343 A1 | 7/2009 | Bunch et al. |
| 2009/0219197 A1* | 9/2009 | Bunch ............... G01S 7/003 342/26 B |
| 2010/0019938 A1 | 1/2010 | Bunch |
| 2010/0042275 A1 | 2/2010 | Kirk |
| 2010/0110431 A1* | 5/2010 | Ray ............... B64D 15/20 356/342 |
| 2010/0194628 A1 | 8/2010 | Christianson et al. |
| 2010/0201565 A1 | 8/2010 | Khatwa |
| 2010/0245164 A1 | 9/2010 | Kauffman |
| 2010/0302094 A1 | 12/2010 | Bunch et al. |
| 2011/0074624 A1 | 3/2011 | Bunch |
| 2011/0148692 A1 | 6/2011 | Christianson |
| 2011/0148694 A1 | 6/2011 | Bunch et al. |
| 2012/0029786 A1 | 2/2012 | Calandra et al. |
| 2012/0133551 A1 | 5/2012 | Pujol et al. |
| 2012/0139778 A1 | 6/2012 | Bunch et al. |
| 2013/0226452 A1 | 8/2013 | Watts |
| 2013/0234884 A1* | 9/2013 | Bunch ............... G01W 1/00 342/26 B |
| 2014/0176362 A1 | 6/2014 | Sneed |
| 2014/0362088 A1 | 12/2014 | Veillette et al. |

FOREIGN PATENT DOCUMENTS

| | | |
|---|---|---|
| WO | WO-98/07047 A1 | 2/1998 |
| WO | WO-98/22834 | 5/1998 |
| WO | WO-03/005060 | 1/2003 |
| WO | WO-2009/137158 | 11/2009 |

OTHER PUBLICATIONS

Non-Final Office Action on U.S. Appl. No. 13/238,606 dated May 27, 2015, 14 pages.
Non-Final Office Action on U.S. Appl. No. 14/452,235 dated Apr. 23, 2015, 9 pages.
Non-Final Office Action on U.S. Appl. No. 14/681,901 dated Jun. 17, 2015, 21 pages.
Non-Final Office Action on U.S. Appl. No. 13/841,893 dated Jun. 22, 2015, 27 pages.
Non-Final Office Action on U.S. Appl. No. 13/913,100 dated May 4, 2015, 25 pages.
Non-Final Office Action on U.S. Appl. No. 13/919,406 dated Jul. 14, 2015, 23 pages.
Decision on Appeal for Inter Parties Reexamination Control No. 95/001,860, dated Oct. 17, 2014, 17 pages.
Final Office Action on U.S. Appl. No. 12/892,663 dated Mar. 7, 2013, 13 pages.
Final Office Action on U.S. Appl. No. 13/238,606 dated Apr. 1, 2014, 11 pages.
Final Office Action on U.S. Appl. No. 13/238,606 dated Jan. 22, 2015, 6 pages.
Non-Final Office Action on U.S. Appl. No. 12/892,663 dated May 29, 2013, 14 pages.
Non-Final Office Action on U.S. Appl. No. 13/238,606 dated Jul. 8, 2014, 12 pages.
Non-Final Office Action on U.S. Appl. No. 13/238,606 dated Sep. 23, 2013, 15 pages.
Non-Final Office Action on U.S. Appl. No. 13/717,052 dated Feb. 11, 2015, 15 pages.
Notice of Allowance on U.S. Appl. No. 13/246,769 dated Jan. 8, 2015, 10 pages.
Notice of Allowance on U.S. Appl. No. 13/707,438 dated Feb. 25, 2015, 11 pages.
Office Action for U.S. Appl. No. 12/892,663, dated Oct. 22, 2012, 12 pages.
TOA Technology, printed from website: http://www.toasystems.com/technology.html on Dec. 29, 2010, 2 pages.
Triangulation, from Wikipedia, printed from website: http://en.wikipedia.org/wiki/Triangulation on Dec. 29, 2010, 6 pages.
U.S. Appl. No. 13/717,052, filed Dec. 17, 2012, Woodell et al.
U.S. Appl. No. 13/837,538, filed Mar. 15, 2013, Kronfeld et al.
U.S. Appl. No. 14/162,035, filed Jan. 23, 2014, Kronfeld et al.
U.S. Appl. No. 14/323,766, filed Jul. 3, 2014, Weichbrod et al.
U.S. Appl. No. 14/465,730, filed Aug. 21, 2014, Breiholz et al.

(56) References Cited

OTHER PUBLICATIONS

U.S. Appl. No. 14/465,753, filed Aug. 21, 2014, Breiholz et al.
U.S. Appl. No. 14/608,071, filed Jan. 28, 2015, Breiholz et al.
Boudevillain et al., 2003, Assessment of Vertically Integrated Liquid (VIL) Water Content Radar Measurement, J. Atmos. Oceanic Technol., 20, 807-819.
Greene et al., 1972, Vertically Integrated Water-A New Analysis Tool, Mon. Wea. Rev., 100, 548-552.
Lahiff, 2005, Vertically Integrated Liquid Density and Its Associated Hail Size Range Across the Burlington, Vermont County Warning Area, Eastern Regional Technical Attachment, No. 05-01, 20 pages.
Liu, Chuntao et al., Relationships between lightning flash rates and radar reflectivity vertical structures in thunderstorms over the tropics and subtropics, Journal of Geophysical Research, vol. 177, D06212, doi:10.1029/2011JDo17123,2012, American Geophysical Union, 2012, 19 pages.
Non-Final Office Action on U.S. Appl. No. 13/238,606 dated Mar. 27, 2015, 21 pages.
Non-Final Office Action on U.S. Appl. No. 14/162,035 dated Feb. 4, 2016, 9 pages.
Non-Final Office Action on U.S. Appl. No. 14/086,844 dated Nov. 10, 2015, 17 pages.
Notice of Allowance on U.S. Appl. No. 14/681,901 dated Dec. 23, 2015, 8 pages.
Zipser, Edward J. et al., The Vertical Profile of Radar Reflectivity of Convective Cells: A Strong Indicator of Storm Intensity and Lightning Probability?, American Meteorological Society, Aug. 1994, 9 pages.
U.S. Appl. No. 14/206,239, filed Mar. 12, 2014, Rockwell Collins.
Final Office Action on U.S. Appl. No. 13/246,769 dated Sep. 16, 2014, 18 pages.
Non-Final Office Action on U.S. Appl. No. 13/717,052 dated Sep. 9, 2014, 8 pages.
Notice of Allowance on U.S. Appl. No. 12/075,103 dated Aug. 4, 2014, 10 pages.
U.S. Appl. No. 12/075,103, filed Mar. 7, 2008, Woodell et al.
U.S. Appl. No. 13/841,893, filed Mar. 15, 2013, Rockwell Collins, Inc.
U.S. Appl. No. 13/919,406, filed Jun. 17, 2013, Rockwell Collins, Inc.
U.S. Appl. No. 14/086,844, filed Nov. 21, 2013, Rockwell Collins, Inc.
U.S. Appl. No. 14/206,651, filed Mar. 12, 2014, Rockwell Collins, Inc.
U.S. Appl. No. 14/207,034, filed Mar. 12, 2014, Rockwell Collins, Inc.
3-D Weather Hazard and Avoidance System, Honeywell InteVue Brochure dated Nov. 2008, 4 pages.
Advisory Action for U.S. Appl. No. 12/075,103, dated Feb. 13, 2013, 3 pages.
Advisory Action for U.S. Appl. No. 12/075,103, dated Nov. 8, 2010, 3 pages.
Advisory Action for U.S. Appl. No. 12/075,103, dated Oct. 15, 2010, 3 pages.
Bovith et al., Detecting Weather Radar Clutter by Information Fusion with Satellite Images and Numerical Weather Prediction Model Output; Jul. 31-Aug. 4, 2006, 4 pages.
Burnham et al., Thunderstorm Turbulence and Its Relationship to Weather Radar Echoes, J. Aircraft, Sep.-Oct. 1969, 8 pages.
Corridor Integrated Weather System (CIWS), www.ll.mit.edu/mission/aviation/faawxsystems/ciws.html, received on Aug. 19, 2009, 3 pages.
Doviak et al., Doppler Radar and Weather Observations, 1984, 298 pages.
Dupree et al.,FAA Tactical Weather Forecasting in the United States National Airspace, 29 pages.
Goodman et al., LISDAD Lightning Observations during the Feb. 22-23, 1998 Central Florida Tornado Outbreak, http:www.srh.noaa.gov/topics/attach/html/ssd98-37.htm, Jun. 1, 1998, 5 pages.

Greene et al., Vertically Integrated Liquid Water-A New Analysis Tool, Monthly Weather Review, Jul. 1972, 5 pages.
Hodanish, Integration of Lightning Detection Systems in a Modernized National Weather Service Office, http://www.srh.noaa.gov/mlb/hoepub.html, retrieved on Aug. 6, 2007, 5 pages.
Honeywell, RDR-4B Forward Looking Windshear Detection/Weather Radar System User's Manual with Radar Operation Guidelines, Jul. 2003.
Keith, Transport Category Airplane Electronic Display Systems, Jul. 16, 1987, 34 pages.
Klingle-Wilson et al., Description of Corridor Integrated Weather System (CIWS) Weather Products, Aug. 1, 2005, 120 pages.
Kuntman et al, Turbulence Detection and Avoidance System, Flight Safety Foundation 53rd International Air Safety Seminar (IASS), Oct. 29, 2000.
Kuntman, Airborne System to Address Leading Cause of Injuries in Non-Fatal Airline Accidents, ICAO Journal, Mar. 2000.
Kuntman, Satellite Imagery: Predicting Aviation Weather Hazards, ICAO Journal, Mar. 2000, 4 pages.
Meteorological/KSC/L71557/Lighting Detection and Ranging (LDAR), Jan. 2002, 12 pages.
Nathanson, Fred E., "Radar and Its Composite Environment," Radar Design Principles, Signal Processing and the Environment, 1969, 5 pages, McGraw-Hill Book Company, New York et al.
Notice of Allowance for U.S. Appl. No. 10/631,253, dated Jul. 28, 2005, 7 pages.
Notice of Allowance for U.S. Appl. No. 11/256,845, dated May 27, 2009, 7 pages.
Notice of Allowance for U.S. Appl. No. 11/370,085, dated Dec. 30, 2008, 6 pages.
Notice of Allowance for U.S. Appl. No. 11/402,434, dated Nov. 4, 2008, 6 pages.
Notice of Allowance for U.S. Appl. No. 12/474,102, dated Jan. 20, 2012, 6 pages.
Office Action for U.S. Appl. No. 11/256,845, dated Aug. 21, 2007, 4 pages.
Office Action for U.S. Appl. No. 10/631,253, dated Jan. 14, 2004, 5 pages.
Office Action for U.S. Appl. No. 10/631,253, dated Jun. 30, 2004, 4 pages.
Office Action for U.S. Appl. No. 11/256,845, dated Dec. 5, 2006, 5 pages.
Office Action for U.S. Appl. No. 11/256,845, dated Jul. 28, 2008, 5 pages.
Office Action for U.S. Appl. No. 11/256,845, dated Jun. 22, 2006, 5 pages.
Office Action for U.S. Appl. No. 11/370,085, dated Aug. 15, 2007, 10 pages.
Office Action for U.S. Appl. No. 11/370,085, dated Dec. 4, 2007, 13 pages.
Office Action for U.S. Appl. No. 11/370,085, dated Oct. 9, 2008, 5 pages.
Office Action for U.S. Appl. No. 11/402,434, dated Jul. 17, 2008, 5 pages.
Office Action for U.S. Appl. No. 11/402,434, dated Mar. 29, 2007, 8 pages.
Office Action for U.S. Appl. No. 11/402,434, dated Oct. 26, 2006, 7 pages.
Office Action for U.S. Appl. No. 11/402,434, dated Sep. 20, 2007, 7 pages.
Office Action for U.S. Appl. No. 12/075,103, dated Feb. 26, 2010, 11 pages.
Office Action for U.S. Appl. No. 12/075,103, dated Jul. 29, 2010, 7 pages.
Office Action for U.S. Appl. No. 12/075,103, dated Jun. 20, 2012, 5 pages.
Office Action for U.S. Appl. No. 12/075,103, dated Nov. 29, 2012, 6 pages.
Office Action for U.S. Appl. No. 12/474,102, dated Sep. 7, 2011, 8 pages.
Office Action for U.S. Appl. No. 13/717,052, dated Aug. 22, 2013, 15 pages.

(56) References Cited

OTHER PUBLICATIONS

Office Action on U.S. Appl. No. 12/075,103 dated Apr. 9, 2014, 5 pages.
Office Action on U.S. Appl. No. 12/075,103 dated Jul. 31, 2013, 8 pages.
Office Action on U.S. Appl. No. 13/246,769 dated Apr. 21, 2014, 18 pages.
Office Action on U.S. Appl. No. 13/717,052 dated Dec. 23, 2013, 7 pages.
Pessi et al., On the Relationship Between Lightning and Convective Rainfall Over the Central Pacific Ocean, date unknown, 9 pages.
RDR-4B Honeywell User Manual for Forward Looking Windshear Detection/Weather Radar System, Rev. 6, Jul. 2003, 106 pps.
Robinson et al., En Route Weather Depiction Benefits of the Nexrad Vertically Integrated Liquid Water Product Utilized by the Corridor Integrated Weather System, 10th Conference on Aviation, Range, and Aerospace Meteorology (ARAM), 2002, 4 pages.
Stormscope Lightning Detection Systems, L3 Avionics Systems, retrieved on Jul. 11, 2011, 6 pages.
US Office Action on U.S. Appl. No. 13/717,052 dated Mar. 27, 2014, 6 pages.
Waldvogel et al., The Kinetic Energy of Hailfalls. Part I: Hailstone Spectra, Journal of Applied Meteorology, Apr. 1978, 8 pages.
Wilson et al., The Complementary Use of Titan-Derived Radar and Total Lightning Thunderstorm Cells, 10 pages.
Zipser et al., The Vertical Profile of Radar Reflectivity and Convective Cells: A Strong Indicator of Storm Intensity and Lightning Probability? America Meteorological Society, 1994, 9 pages.

\* cited by examiner

WEATHER RADAR SYSTEM AND METHOD FOR HIGH ALTITUDE CRYSTAL WARNING INTERFACE

CROSS REFERENCE TO RELATED APPLICATIONS

The present application is related to U.S. application Ser. No. 13/919,406 filed on Jun. 17, 2013 (13CR351 (047141-0923)), Now U.S. Pat. No. 9,249,157, U.S. application Ser. No. 13/841,893 filed Mar. 15, 2013 (12CR1778 (047141-0905)), Now U.S. Pat. No. 9,244,166, U.S. application Ser. No. 14/206,239 filed on an even date herewith invented by Sishtla, et al. (13CR814 (047141-0977)), U.S. application Ser. No. 13/246,769 filed Sep. 27, 2011 (11CR243 (047141-0802)) and U.S. application Ser. No. 14/206,651, filed on an even date herewith invented by Dana, et al., (14CR048 (047141-0979)), all incorporated herein by reference in their entireties and assigned to the assignee of the present application.

BACKGROUND

This specification relates generally to the display of a weather hazard warning. More particularly, this specification relates to the display of a weather hazard warning related to ice crystals.

Conventional aircraft hazard weather radar systems, such as the WXR 2100 MultiScan™ radar system manufactured by Rockwell Collins, Inc., have Doppler capabilities and are capable of detecting at least four parameters: weather range, weather reflectivity, weather velocity, and weather spectral width or velocity variation. The weather reflectivity is typically scaled to green, yellow, and red color levels that are related to rainfall rate. The radar-detected radial velocity variation can be scaled to a turbulence level and displayed as magenta. Such weather radar systems can conduct vertical sweeps and obtain reflectivity parameters at various altitudes.

Ice crystals pose threats to aircraft and their components. For example, sensors can provide improper readings when clogged by ice. Probes and engines can also be susceptible to damage caused by mixed phase and glaciated ice crystals when operating near areas of deep convection and at higher altitudes. Engine rollback issues are believed to be related to ice crystal accretion, followed by aggregate detachment in solid form before continuing through the aircraft engine.

Radar reflectivity levels in and around the convective regions at high altitudes associated with high altitude ice crystal formation have typically been very low and can be difficult to detect. Further, it is difficult to distinguish low reflectivity precipitation areas on a conventional display from areas of high altitude ice crystal (HAIC) formation. Detection and display of high altitude ice crystallization is desirous because the icing events caused by HAIC conditions can have a direct impact on aircraft, crew and passengers depending on the severity of the accretion.

Thus, there is a need for an aircraft hazard warning system method that provides a user interface or human machine interface (HMI) for high altitude ice crystal (HAIC) conditions. There is also a need for a hazard detection system that displays high altitude associated threat (HAAT) conditions. There is also a need for an HAIC detection system and method. There is a further need for a display protocol for HAAT or HAIC warnings. Further, there is a need for a display protocol that prioritizes detection and alerting functions for HAAT and/or HAIC conditions. Yet further, there is a need for an aircraft hazard warning system that alerts a pilot to HAIC conditions.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

An exemplary embodiment relates to an aircraft hazard warning system. The aircraft hazard warning system includes a processing system for determining a high altitude ice crystal (HAIC) condition and causing a warning of the HAIC condition to be displayed.

Another exemplary embodiment relates to a method of providing a high altitude ice crystal (HAIC) warning on an aircraft using an electronic processor. The method includes receiving radar reflectivity data, determining a HAIC condition exists, and displaying a warning of the HAIC condition.

Another embodiment relates to a weather radar system for an aircraft. The weather radar system includes a radar antenna for receiving radar returns, and means for determining a high altitude ice crystal (HAIC) condition and providing a warning of the HAIC condition.

In certain embodiments, the HAIC warning can be displayed using a speckled or cross hatched region indicating a lower level of hazard.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, systems and methods for indicating a weather threat to an aircraft are described, according to an exemplary embodiment. An airborne weather radar system is generally configured to project radar beams and to receive radar returns relating to the projected radar beams. The projected radar beams generally pass through air and reflect off of precipitation (e.g., rain, snow, etc.), other aircraft, and terrain (e.g., a mountain, a building). Using the reflected return data, processing electronics associated with the weather radar system can distinguish between types of precipitation and terrain. Weather radar systems are typically configured to display the precipitation as measured weather threats in green (light rain or precipitation), yellow (moderate rain or precipitation), and red (severe rain or precipitation). While this "rain gauge" provides valuable information to the crew, more specific indicators of weather threats to the aircraft are helpful to the crew. For example, high altitude associated threat (HAAT) and/or high altitude ice crystal (HAIC) threat warnings advantageously allow pilots to avoid regions detrimental to aircraft and their engines.

Figure 1:
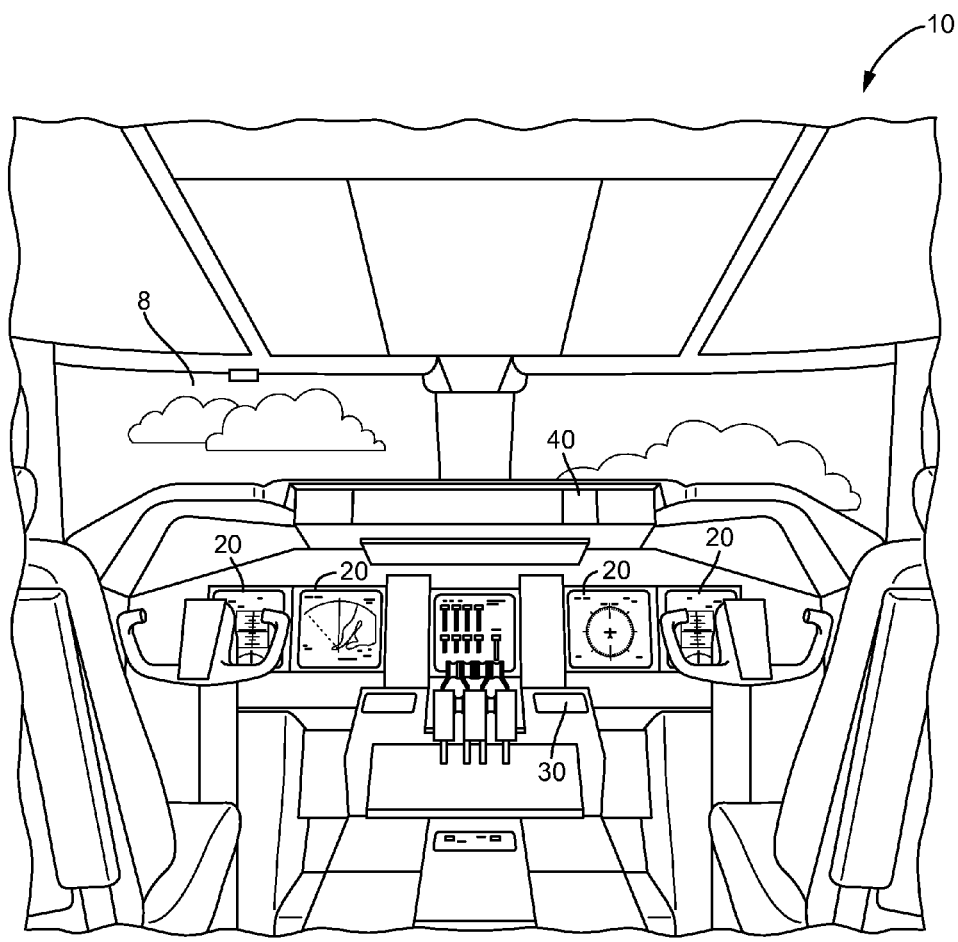
FIG. 1 is a perspective view schematic illustration of an aircraft control center, according to an exemplary embodiment.

Referring now to FIG. 1, an illustration of an aircraft control center or cockpit 10 is shown, according to an exemplary embodiment. Aircraft control center 10 includes flight displays 20 which are generally used to increase visual range and to enhance decision-making abilities. In an exemplary embodiment, flight displays 20 may provide an output from a radar system of the aircraft. For example, flight displays 20 may provide a top-down view, a horizontal view, vertical view/perspective or 3 dimensional view, or any other view of weather and/or terrain detected by a radar system on the aircraft. The views of weather may include monochrome or color graphical representations of the weather. Graphical representations of weather may include an indication of altitude of those objects or the altitude relative to the aircraft. Aircraft control center 10 may further include other user interface elements such as an audio device 30 (e.g., speaker, electro-acoustic transducer, etc.) and illuminating or flashing lamps 40. Weather can be displayed as colored regions on the aircraft according to ARINC standards.

In one embodiment, a HAIC and/or HAAT warning can be provided on any of displays 20 as part of a weather radar display. In one embodiment, the HAAT warning is displayed as a red speckled region, and the HAIC warning is displayed as a yellow speckled region. The red speckled region indicates a higher severity of threat for the HAAT warning as compared to the yellow speckled region for the HAIC warning.

Figure 2:
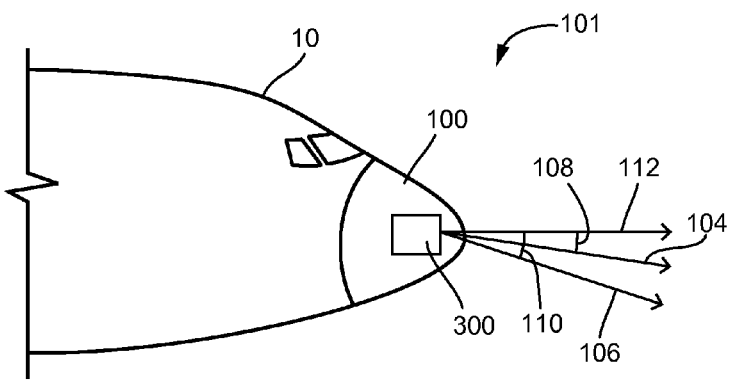
FIG. 2 is a side view schematic illustration of the nose of an aircraft including a weather radar system, according to an exemplary embodiment.

Referring to FIG. 2, the front of an aircraft 101 is shown with aircraft control center 10 and nose 100, according to an exemplary embodiment. A radar system 300 (e.g., a weather radar system or other radar system) is generally located within nose 100 of aircraft 101 or within aircraft control center 10 of aircraft 101. According to various exemplary embodiments, radar system 300 may be located on the top of aircraft 101 or on the tail of aircraft 101 instead. Radar system 300 may include or be coupled to an antenna system. A variety of different antennas or radar systems may be used as part of system 300 (e.g., a split aperture antenna, a monopulse antenna, a sequential lobbing antenna, etc.).

Radar system 300 generally works by sweeping a radar beam horizontally back and forth across the sky. Some embodiments of radar system 300 conduct a first horizontal sweep 104 at tilt angle 1 (108) and a second horizontal sweep 106 at tilt angle 2 (110). Tilt angles 108 and 110 can be with respect to horizontal 112 (e.g., 0 degrees). Radar system 300 can also conduct vertical sweeps to further characterize and identify weather phenomena. Returns from different tilt angles can be electronically merged to form a composite image for display on an electronic display 20 shown, for example, in FIG. 1. Returns can also be processed to, for example, distinguish between terrain and weather, to determine the height of terrain, or to determine the height of weather. Radar system 300 can be a WXR-2100 MultiScan™ radar system or similar system manufactured by Rockwell Collins and configured as described herein. According to other embodiments, radar system 300 may be an RDR-4000 system or similar system manufactured by Honeywell International, Inc. configured as described herein. Radar system 300 may be integrated with other avionic equipment and user interface elements in aircraft control center 10 (e.g., flashing lights 40, displays 20, display elements on a weather radar display, display elements on a terrain display, audio alerting devices 30, navigation systems, TAWs equipment, etc.).

Figure 3:
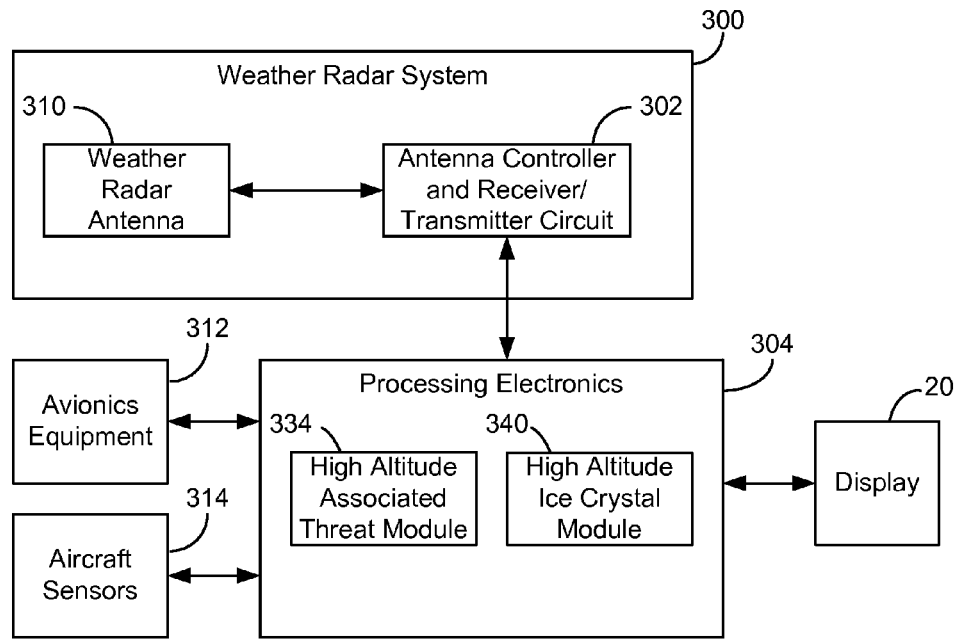
FIG. 3 is a general block diagram of a weather radar system including a high altitude ice crystal (HAIC) module, according to an exemplary embodiment.

Referring to FIG. 3, a block diagram of radar system 300 embodied as a weather radar system is shown, according to an exemplary embodiment. Weather radar system 300 is shown to include a weather radar antenna 310 connected (e.g., directly, indirectly) to an antenna controller and receiver/transmitter circuit 302. Antenna controller and receiver/transmitter circuit 302 may include any number of mechanical or electrical circuitry components or modules for steering a radar beam. For example, circuit 302 may be configured to mechanically tilt the antenna in a first direction while mechanically rotating the antenna in a second direction. In other embodiments, a radar beam may be electronically swept along a first axis and mechanically swept along a second axis. In yet other embodiments, the radar beam may be entirely electronically steered (e.g., by electronically adjusting the phase of signals provided from adjacent antenna apertures, etc.). Circuit 302 may be configured to conduct the actual signal generation that results in a radar beam being provided from weather radar antenna 310 and to conduct the reception of returns received at radar antenna 310. Radar return data is provided from circuit 302 to processing electronics 304 for processing. For example, processing electronics 304 can be configured to interpret the returns for display on display 20.

Processing electronics 304 can also be configured to provide control signals or control logic to circuit 302. For example, depending on pilot or situational inputs, processing electronics 304 may be configured to cause circuit 302 to change behavior or radar beam patterns. In other words, processing electronics 304 may include the processing logic for operating weather radar system 300. It should be noted that processing electronics 304 may be integrated into radar system 300 or located remotely from radar system 300, for example, in aircraft control center 10.

Processing electronics 304 are further shown as connected to aircraft sensors 314 which may generally include any number of sensors configured to provide data to processing electronics 304. For example, sensors 314 could include temperature sensors, humidity sensors, infrared sensors, altitude sensors, a gyroscope, a global positioning system (GPS), or any other aircraft-mounted sensors that may be used to provide data to processing electronics 304. It should be appreciated that sensors 314 (or any other component shown connected to processing electronics 304) may be indirectly or directly connected to processing electronics 304. Processing electronics 304 are further shown as connected to avionics equipment 312 and include a high altitude ice crystal (HAIC) module 340 and a high altitude associated threat (HAAT) module 334. Modules 340 and 334 advantageously detect and locate HAIC and HAAT conditions and cause display 20 to provide a visual and/or audio warning of such conditions. Modules 334 and 340 process data associated with weather radar reflectivity levels and data from other sensors (e.g., temperature, altitude, etc.) to determine HAIC and HAAT conditions. Avionics equipment 312 can be or include a flight management system, a navigation system, a backup navigation system, or another aircraft system configured to provide inputs to processing electronics 304.

Figure 4:
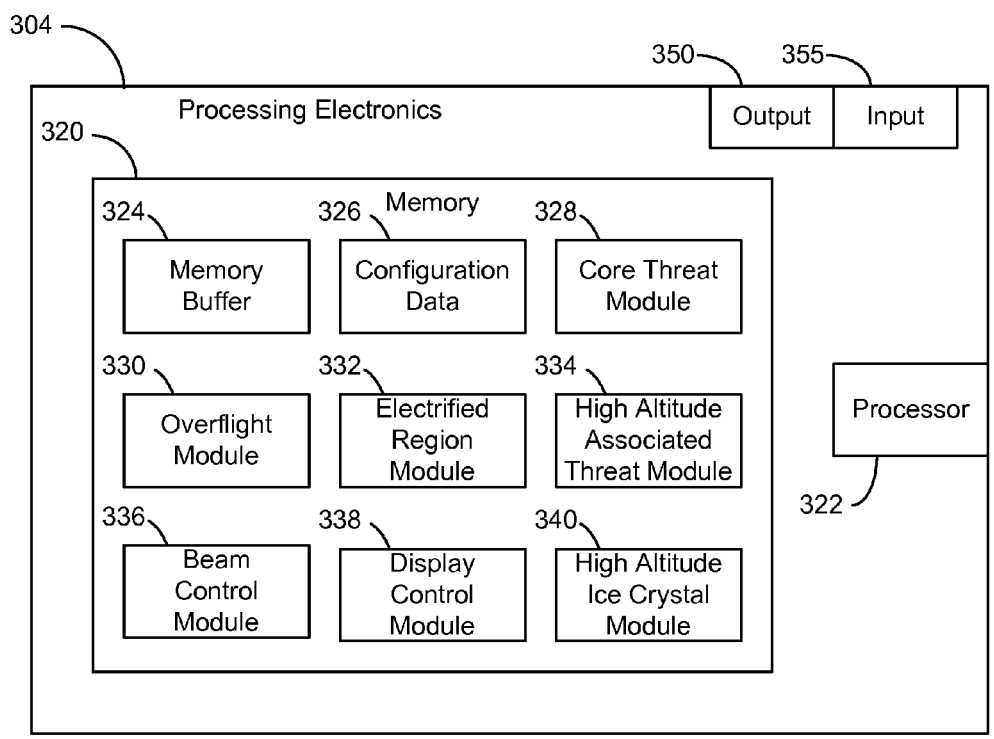
FIG. 4 is a general block of a horizontal plan view weather display showing a HAIC warning.

Referring to FIG. 4, a detailed block diagram of processing electronics 304 of FIG. 3 is shown, according to an exemplary embodiment. Processing electronics 304 includes a memory 320 and processor 322. Processor 322 may be or include one or more microprocessors, an application specific integrated circuit (ASIC), a circuit containing one or more processing components, a group of distributed processing components, circuitry for supporting a microprocessor, or other hardware configured for processing. According to an exemplary embodiment, processor 322 is configured to execute computer code stored in memory 320 to complete and facilitate the activities described herein. Memory 320 can be any volatile or non-volatile memory device capable of storing data or computer code relating to the activities described herein. For example, memory 320 is shown to include modules 328-340 which are computer code modules (e.g., executable code, object code, source code, script code, machine code, etc.) configured for execution by processor 322. When executed by processor 322, processing electronics 304 is configured to complete the activities described herein. Processing electronics 304 includes hardware circuitry for supporting the execution of the computer code of modules 328-340. For example, processing electronics 304 includes hardware interfaces (e.g., output 350) for communicating control signals (e.g., analog, digital) from processing electronics 304 to circuit 302 or to display 20. Processing electronics 304 may also include an input 355 for receiving, for example, radar return data from circuit 302, feedback signals from circuit 302 or for receiving data or signals from other systems or devices.

Memory 320 includes a memory buffer 324 for receiving radar return data. The radar return data may be stored in memory buffer 324 until buffer 324 is accessed for data. For example, a core threat module 328, overflight module 330, electrified region module 332, HAAT module 334, display control module 338, HAIC module 340 or another process that utilizes radar return data may access buffer 324. The radar return data stored in memory 320 may be stored according to a variety of schemes or formats. For example, the radar return data may be stored in an x,y or x,y,z format, a heading-up format, a north-up format, a latitude-longitude format, a radial format, or any other suitable format for storing spatial-relative information.

Memory 320 further includes configuration data 326. Configuration data 326 includes data relating to weather radar system 300. For example, configuration data 326 may include beam pattern data which may be data that a beam control module 336 can interpret to determine how to command circuit 302 to sweep a radar beam. For example, configuration data 326 may include information regarding maximum and minimum azimuth angles of horizontal radar beam sweeps, azimuth angles at which to conduct vertical radar beam sweeps, timing information, speed of movement information, and the like. Configuration data 326 may also include data, such as threshold values, model information, look up tables, and the like used by modules 328-340 to identify and assess threats to aircraft 101.

Memory 320 is further shown to include a core threat module 328 which includes logic for using radar returns in memory buffer 324 to make one or more determinations or inferences relating to core threats to aircraft 101. For example, core threat module 328 may use temperature and radar return values at various altitudes to calculate a probability that lightning, hail, and/or strong vertical shearing exists within a weather cell. Core threat module 328 may be configured to compare the probability and/or severity of the core threat to a threshold value stored, for example, in core threat module 328 or configuration data 326. Core threat module 328 may further be configured to output a signal to display control module 338 indicative of the probability of the core threat, of the inferred threat level within the weather cell, or of the inferred threat level within the weather cell being greater than the measured threat due to radar returns from rainfall. The signal may further cause a change in a color on aviation display 20 associated to the threat level to aircraft 101.

Memory 320 is further shown to include an overflight module 330 which includes logic for using radar returns in memory buffer 324 to make one or more determinations or inferences based on weather below aircraft 101. For example, overflight module 330 may be configured to determine the growth rate of a weather cell and/or the change in altitude of an echo top of a weather cell over time. Overflight module 330 may further be configured to calculate a probability that a weather cell will grow into the flight path of aircraft 101. Overflight module 330 may be configured to output a signal to display control module 338 indicating the threat of the growing weather cell in relation to the flight path of aircraft 101. For example, the signal may indicate predicted intersection of the flight path of aircraft 101 and the weather cell, rate of growth of the weather cell, or predicted growth of the weather cell to within a threshold distance of the flight path of aircraft 101. For example, the signal may cause an icon to be displayed on aviation display 20 in a location corresponding to the growing cell, wherein the size of the icon may represent the size, amount, or probability of threat to the aircraft. Overflight module 330 may be configured to inhibit display of weather far below, and thus not a threat to, aircraft 101.

Memory 320 is further shown to include an electrified region module 332 which includes logic for using radar returns in memory buffer 324 to make one or more determinations or inferences regarding potentially electrified regions around the weather cell. For example, electrified region module 332 may be configured to use temperature and reflectivity to determine whether a region around a weather cell is likely to produce lightning. Electrified region module 332 may be configured to determine a probability of aircraft 101 producing a lightning strike if the aircraft flies through a particular region based on the reflectivity around a convective cell near the freezing layer. Electrified region module 332 may further be configured to cause a pattern to be displayed on aviation display 20. For example, electrified region module 332 may be configured to output a signal to display control module 338 indicating the existence, location, and/or severity of risk of the electrified region.

Memory 320 is further shown to include HAAT module 334 which includes logic for using radar returns (e.g., data) in memory buffer 324 to make one or more determinations or inferences regarding high altitude associated threats (e.g., threats related to a blow off or anvil region of a weather cell). HAAT conditions can be associated with high severity threat conditions such as hail, lightning, turbulence, etc. For example, HAAT module 334 may be configured to use wind speed, wind direction, and size of a weather cell to predict the presence of an anvil region downwind of a weather cell that may contain lightning, hail, and/or turbulence. HAAT module 334 may be configured to cause a pattern (e.g., a red speckled region) to be displayed on an aviation display 20. For example, HAAT module 334 and module 338 can be configured to output a signal to display control module 338 indicating the existence, location, and severity or risk of the anvil region. HAAT module 334 can detect a HAAT condition based upon the presence of convective cells reaching high altitudes and having anvil shapes. Such conditions can be sensed using the techniques described in U.S. application Ser. No. 13/919,406 now U.S. Pat. No. 9,244,157 and Ser. No. 13/841,893 now U.S. Pat. No. 9,244,166. Ice crystals may be present in a HAAT region. A HAAT condition generally is a more significant threat than a HAIC condition. HAAT conditions can determine a core threat or core hazard assessment by inferring the presence of lightning and hail and by measuring reflectivity as a function of altitude with a highly reflective weather region. High altitude associated threats can be predicted by algorithms that determine the presence of tall convective cells that reach high altitudes and bloom outward into familiar anvil shapes of a cumulonimbus cell. The anvil portion of the cell reflects radar energy very poorly but is associated with a number of hazards including lightning, hail and turbulence. Storm top analysis can be utilized to identify tall convective cells that bloom outward in one embodiment. Using the relationship between temperature and reflectivity can identify associated threats in one embodiment. Higher reflectivities at lower temperatures indicate areas of hazards such as hail in one embodiment.

In one embodiment, HAIC module 340 can infer a HAIC condition. In one embodiment, the HAIC condition can be inferred by the following process. If radar system 300 detects temperature anomalies and large areas of weaker reflectivity in the vicinity of a convective core, vertical scans and/or auxiliary horizontal scans can be commanded via module 336 to look for the presence of high water content (high reflectivity) beneath the areas that were depicted as weaker reflectivity (green or black). If such a scenario is identified using the vertical and horizontal beams, the area is tagged as potential for ice crystal icing or a HAIC condition. HAIC module 340 and weather radar system 300 can be configured to use coherent and non-coherent integration processes to detect presence of the HAIC or HAIC$^2$ condition and its location in one embodiment. Alternatively, module 340 and weather radar system 300 can utilize a dual frequency or dual polarization process. In one embodiment, HAIC or HAIC$^2$ module receives data associated with weather returns at high altitude and processes the data to determine existence of a HAIC or HAIC$^2$ condition. The data can be processed by comparing the data to known ice crystal return characteristics to determine a match and therefore a HAIC or HAIC$^2$ condition. In one embodiment, module 340 senses only one of a HAIC or HAIC$^2$ condition. As described above, processing electronics 304 uses avionics and radar return information to infer or detect existence of a HAIC or HAIC$^2$ condition via module 340.

In one embodiment, the HAIC and HAIC$^2$ condition or region shown on the display 20 may be a composite threat display showing on the same display the HAIC and HAIC$^2$ threats detected by system 300 and the HAIC and HAIC$^2$ threats detected or inferred by other HAIC detection sources, including other on-board systems (infrared, LIDAR, etc.), or remote systems (e.g., ground-based radar, satellites, etc.). At any given location, the most significant threat from any of the possible sources may be displayed. In one embodiment, HAIC or HAIC$^2$ module 340 can us an inferential process to detect a HAIC or HAIC$^2$ condition. In one embodiment, the HAIC or HAIC$^2$ condition can be inferred by sensing temperature anomalies and reflectivity characteristics associated with core threats. In such a process, if radar system 300 detects temperature anomalies. A temperature anomaly can be a condition where temperature detected by system 300 (e.g., a temperature sensor (e.g., Full Authority Digital Engine Control (FADEC) saturated temperature input) of sensors 314) is different than a predicted (e.g. expected) or baseline atmospheric temperature. The temperature can be a saturated temperature value in one embodiment. The temperature value can be adjusted for heating caused by the movement of aircraft 101 through the atmosphere in one embodiment. The predictive or baseline temperature can be from satellite trip information. A large discrepancy (e.g., 15 degrees or more) between the actual temperature and the predicted temperature at the altitude of the aircraft 101 can indicate a potential icing condition according to one embodiment. In one embodiment, a local temperature reading more than 15 degrees warmer than the expected temperature indicates an anomaly. A low pass filter or averaging technique can be used to prevent a spurious reading from improperly causing a temperature anomaly to be detected.

Weather radar system 300 may optionally receive data from another on-board HAIC detection source (e.g., infrared, LIDAR, etc.) or a remote systems HAIC detection source (e.g., ground-based radar, satellites, etc.) in one embodiment. System 300 identifies convective cells or cores in some embodiments. Convective cores can be identified using cell height, cell growth, and other analysis techniques. Generally, cores in front of or along the flight path of the aircraft are identified for further analysis, according to one embodiment. Cores can be identified using core threat module 328. Cores can be identified by analyzing spectral characteristics in areas of higher reflectivity in one embodiment. In one embodiment, the information can be used to identify cores or increase confidence in the cores identified using radar parameters. System 300 scans the environment and identifies large areas (e.g. more than a square nm, several square nms, ten square nm, etc.) of weaker reflectivity in the vicinity of a convective core. Areas for scanning are chosen based upon a presence of core cells.

In one embodiment, HAIC detection assessment or inference may also be performed by other sensors on board the aircraft (infrared, LIDAR, etc.) or off the aircraft by ground radars or satellites. The HAIC detection assessment or inference information may be optionally input to system 300 for identification of the HAIC or HAIC$^2$ region in one embodiment. When the HAIC detection assessment or inference information is input into system 300, the scanning region or location of the radar beams may be directed to scan that region and a higher confidence of the HAIC threat can be determined. HAIC and HAIC$^2$ conditions are caused by strong updrafts that also created turbulence. The Doppler processing of the radar returns or off-aircraft wind information can provide additional information for detection of HAIC and HAIC$^2$ regions. If a HAIC or HAIC$^2$ region is detected, it may be qualified by a turbulence (spectral width) or vertical wind speed as qualifier to determine if HAIC or HAIC$^2$ are present. In one embodiment, vertical scans and/or auxiliary horizontal scans can be commanded via module 336 to look for the presence of high water content (high reflectivity) beneath the areas that were depicted as weaker reflectivity (green or black). If such a scenario is identified using the vertical and horizontal beams, the area is tagged or identified as a potential area for ice crystal icing or a HAIC or HAIC² condition by module 340 in one embodiment. The area can be identified on display 20 with a HAIC or HAIC² warning. High water content can be identified by using a vertical integrated liquid (VIL) measurement or a reflectivity measurement in one embodiment.

Module 340 includes an inferential detection path which uses a temperature anomaly detector, and a return data analysis module. Module 340 can receive core threat indications from module 328. The temperature anomaly detector compares the sensed outside temperature at or near the altitude of aircraft 101 with the expected temperature at the altitude in accordance with the atmosphere conditions. The expected temperatures can be provided by or derived from data received real time or received during flight preparation. Temperature readings in NEXRAD data can be utilized by the detector for expected temperature values. Once a temperature anomaly is detected, module 340 can provide vertical and horizontal radar returns to an area in the vicinity of a weather cell core as detected by core module 328 according to one embodiment. Various algorithms and techniques can analyze radar returns to determine a HAIC or HAIC² condition. In one embodiment, if the return data analyzer determines that a yellow or higher region is directly in front of aircraft 101 when the temperature anomaly detector detects the temperature anomaly, system 300 identifies a HAIC or HAIC² condition in front of aircraft 101. Alternatively, module 340 can analyze radar returns for a HAIC or HAIC² condition. Beam control module 336 under control of module 340 can have antenna 310 provide beams to the areas in the vicinity of cores found by core threat module 328. When reflectivities from these areas indicate that higher reflectivity is located at a location below the freezing level, module 340 provides an indicator of the presence of a HAIC or HAIC² condition in one embodiment. For example, if precipitation rates associated with a red or yellow region are detected below the freezing level, a HAIC or HAIC² condition is present.

HAIC or HAIC² module 340 can directly detect a HAIC or HAIC² condition using a combination of coherent and non-coherent integration path. The path receives a series of inphase I signals associated with an IQ demodulated signal from radar returns and a series of quadrature phase Q signals associated with the IQ data from radar returns from coherent integrators respectively. The one integrator provides a value $I_K$ according to the equation $\Sigma_{k=1}^{N_P} I_k$ in one embodiment. Another integrator provides the value $Q_K$ according to the equation $\Sigma_{k=1}^{N_P} Q_k$ in one embodiment. $N_P$ is the number of pulses in the coherent integrator, and these coherent sums are updated at a rate $R_{PRF}/N_P$ where $R_{PRF}$ is the pulse repetition frequency. In one embodiment, system 300 provides multiple rapid pulses on target. An amplitude detector determines the amplitude associated with each combination of $I_K$ and OK according to the equation $Z_K = I_K^2 + Q_K^2$ in one embodiment. $I_K$ and $Q_K$ represent voltage values at the output of the coherent integrators 602 and 604 associated with return data. These sums can be implemented with a Fourier transform that also will provide Doppler information. The detector can be any monotonic function of the input $I_K^2 + Q_K^2$, e.g., a logarithm or a square root. A non-coherent integrator non-coherently sums the values of Z according to the equation $\zeta = \Sigma_{K=1}^{N_D} Z_K$. $N_D$ is the number of dwells over which non-coherent integration is performed, and the update rate of $\zeta$ is $R_{PRF}/(N_P N_D)$. Non-coherent integration after the amplitude detector is less efficient than coherent integration, but does not require signal coherence from dwell to dwell (both in phase and amplitude). A detector determines if the value from the integrator is greater than a threshold value T. If so, the data is further processed to determine if a HAIC or HAIC² condition is detected.

Various algorithms or techniques can be utilized to discriminate a HAIC or HAIC² condition from the radar return data. Module 340 can compare the characteristics of the radar data to known ice crystal reflectivity characteristics to determine a HAIC or HAIC² condition. For example, a HAIC² condition can be determined when reflectivity levels are above a level zero or nominal level and less than a level associated with liquid precipitation. According to another example, the algorithm can utilize temperature and reflectivity to determine the presence of a HAIC or HAIC² condition. According to another embodiment, a HAIC or HAIC² condition can be determined if the appropriate reflectivity level is provided across a significant area (e.g., many range bins). According to yet another embodiment, temperature, combined with reflectivity level or area and reflectivity level can be utilized to determine the presence of a HAIC or HAIC² condition. In another embodiment, the radar returns are processed to determine whether the radar returns indicate spherical targets which are more likely water or non-spherical targets which are more likely ice crystals. In one embodiment, if the temperature is below temperature threshold (e.g. −20 degrees Celsius), the reflectivity level is consistent with ice crystal levels and the altitude is above a threshold (e.g. 10,000 feet), a HAIC or HAIC² condition is detected. In one embodiment, modern fuzzy logic techniques can be utilized to detect and discriminate HAIC² conditions. The reflectivity characteristics of known HAIC and HAIC² can be stored and used for comparisons. In one embodiment, HAIC and HAIC² can be stored with respect to particular locations or locations types (e.g., continental, maritime, etc.) and/or seasons and the comparisons can be made with consideration of location and/or season. If the detector detects that the value from the non-coherent integrator is less than the value T, a HAIC or HAIC² condition is not detected. The value T represents a threshold power value for a HAIC or HAIC² evaluation. Evaluation can be performed by analyzer 612 to identify regions of HAIC or HAIC² conditions in one embodiment. A qualifier 614 can use detection of turbulence to qualify the regions of HAIC or HAIC² conditions in one embodiment. Doppler processing or off-aircraft wind information can be used to qualify the regions in one embodiment. Advantageously, module 340 allows ice crystals to be detected across a longer distance.

The module 340 advantageously serves to coherently integrate the pulses within a dwell using the integrators and non-coherently integrating the energy from each dwell using the amplitude detector and the non-coherent integrator. The combination of coherent and non-coherent integration allows for HAIC or HAIC² decorrelation over the integration period in one embodiment. Integration is done over time scales shorter than the radar scan time in one embodiment. The path advantageously increases detection range to a point where discrimination and avoidance of HAIC regions are feasible for aircraft 101. Advantageously, the path can use the same pulses as used for X band weather radar to avoid disruption of other radar-sensing operations in one embodiment. Although the integration period degrades angular resolution of the data, it is an acceptable tradeoff to determine HAIC or HAIC² conditions.

Memory 320 is further shown to include HAIC module 340 which includes logic for using radar returns in memory buffer 324 to make one or more determinations or inferences regarding threats related to a HAIC condition. Module 340 can be combined with module 338, be a hard wired ASIC, or programmable logic circuit in one embodiment. HAIC module 340 and weather radar system 300 can be configured to use coherent and non-coherent integration processes discussed in related U.S. application Ser. No. 14/206,239 (047141-0977) incorporated herein by reference to detect presence of the HAIC condition and its location in one embodiment. Alternatively, module 340 and weather radar system 300 can utilize a dual frequency or dual polarization process discussed in related U.S. patent application Ser. No. 14/206,651 (047141-0979) incorporated herein by reference in one embodiment. In one embodiment, HAIC module 340 receives data associated with weather returns at high altitude and processes the data to determine existence of a HAIC condition. The data can be processed by comparing the data to known ice crystal return characteristics to determine a match and therefore a HAIC condition.

HAIC module 340 and module 338 can be configured to cause a pattern (e.g., a yellow speckled region) to be displayed on an aviation display 20 in one embodiment. HAIC module 340 is configured to output a signal or data to display control module 338 indicating the existence, location, and severity or risk of the HAIC condition or region in one embodiment. Module 338 can cause the appropriate video signal to be provided to display 20.

Memory 320 is further shown to include a beam control module 336. Beam control module 336 may be an algorithm for commanding circuit 302 to sweep a radar beam. Beam control module 336 may be used, for example, to send one or more analog or digital control signals to circuit 302. The control signals may be, for example, an instruction to move the antenna mechanically, an instruction to conduct an electronic beam sweep in a certain way, an instruction to move the radar beam to the left by five degrees, etc. Beam control module 336 may be configured to control timing of the beam sweeps or movements relative to aircraft speed, flight path information, transmission or reception characteristics from weather radar system 300 or otherwise. Beam control module 336 may receive data from configuration data 326 for configuring the movement of the radar beam.

Memory 320 is further shown to include a display control module 338 which includes logic for displaying weather information on aviation display 20. For example, display control module 338 may be configured to display radar return information received from memory buffer 324 and to determine a gain level or other display setting for display of an inferred threat to aircraft 101 on a weather radar display. Display control module 338 may be configured to receive signals relating to threats to aircraft 101 from core threat module 328, overflight module 330, electrified region module 332, HAAT 334, and HAIC module 340. Display control module 338 may further be configured to cause, in response to one or more signals received from threat modules 328-334 and 340 and threshold values from configuration data 326, a change in color of a portion of an image on aviation display 20, a pattern (e.g., a speckled region) to be overlaid on an image on aviation display 20, and an icon to be shown on aviation display 20. Display control module 338 may be configured to cause a change in size, location, shape, or color of the colored regions, patterns, symbols, and/or icons in response to updated signals received from modules 328-336 and 340.

Processing electronics 304 may be configured to use none, some, or all of the threat modules 328-334 and 340 described above. For example, processing electronics 304 may have an automatic mode, in which weather radar antenna 310 is automatically controlled (e.g., direction, gain, etc.) and core threat module 328, overflight module 330, electrified region module 332, HAAT module 334 and HAIC module 340 are all processing information looking for inferred threats. Processing electronics 304 can have a manual mode, in which one or more of core threat module 328, overflight module 330, electrified region module 332, HAAT module 334 and HAIC module 340 are disabled, for example, for diagnostic purposes.

Figure 5:
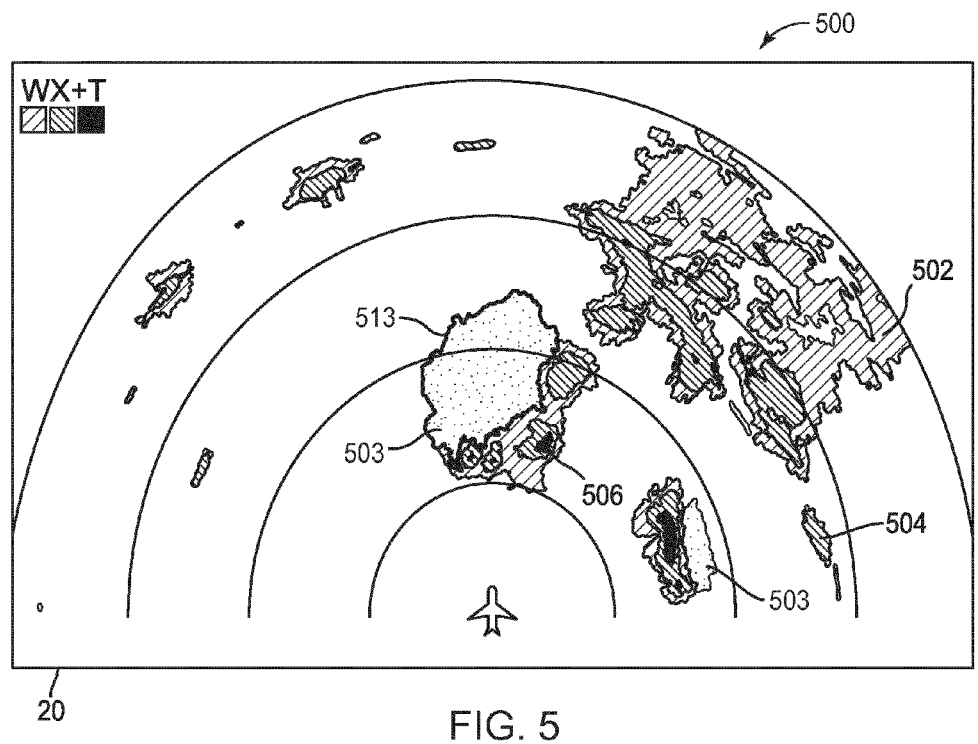
FIG. 5 is a schematic illustration of an aviation horizontal plan view weather display showing a HAIC warning, according to an exemplary embodiment.

Referring now to FIG. 5, a schematic illustration of aviation display 20 showing a weather radar display 500 including precipitative (or weather) regions 502, 504, and 506 corresponding to radar returns according to an exemplary embodiment. Processing electronics 304 may be configured to cause aviation display 20 to show measured threats to aircraft 101 using symbology, icons, or text. In FIG. 5, light rain is shown as a slanted down right to left cross hatched area region (e.g., region 502), which is often indicated with a green color on display 20. A moderate rain is shown as a slanted down left to right cross hatched region (e.g., region 504) in FIG. 5 often colored yellow on display 20 to indicate caution to the crew. Solid black regions (e.g., region 506) in FIG. 5 correspond to heavy rain, and are usually colored red on display 20 to indicate warning to the crew. The area outside of regions 502, 504, and 506 can have a black color on display 20 to indicate a very low or zero precipitation rate in one embodiment. Region 502, 504, and 506 can be shown in accordance with Federal Aviation Administration (FAA) standards.

Generally, a crew flies through green regions 502, always avoids red regions 506, and uses their best judgment on yellow regions 504. In the example shown, a crew heading to the right of the aircraft's track on display 500 may decide to bank right and fly through regions 502 rather than climbing or banking left to avoid the weather cell (region 506) directly in front of aircraft 101 and region 503 which represents a HAIC condition.

As described above, processing electronics 304 uses avionics and radar return information to infer or detect existence of a HAIC condition via module 340. The HAIC condition can be symbolized as a stippled region 503 on display 20. Region 503 can be stippled using yellow dots to signify caution. Alternatively, cross hatching or other dot colors can be utilized to show region 503. Region 503 can have a border 513 in yellow or other color or no border at all.

A caution level coloring for region 503 is chosen because icing threats generally require an exposure time in the region of HAIC conditions. Applicants believe that an exposure time associated a 50-100 nautical miles (nm) of travel can expose aircraft 101 to detrimental icing.

Figure 6:
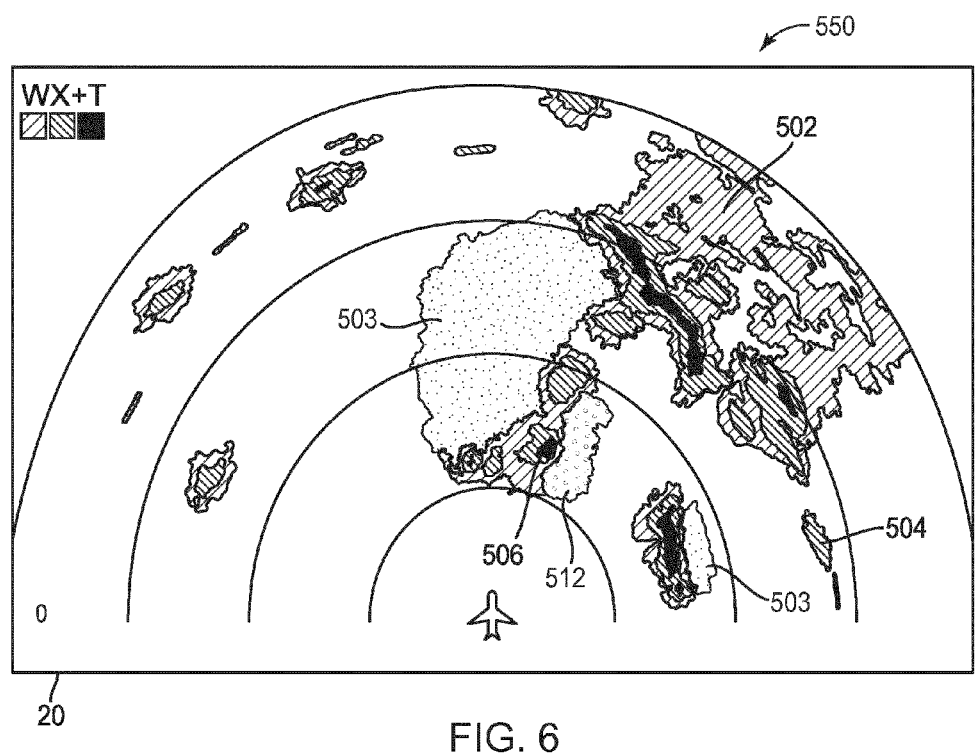
FIG. 6 is a schematic illustration of an aviation horizontal plan view weather display showing a HAIC warning and a HAAT warning, according to an exemplary embodiment.

With reference to FIG. 6, processing electronics 304 uses avionics and radar return information to infer or detect HAAT condition indicated by region 512 as well as HAIC conditions indicated by regions 503 on a display 550 similar to display 500. Display 550 also includes regions 502, 504, and 506. In one embodiment, region 512 is shown as a stippled area with red dots or dots of other color indicating a hazardous area. Alternatively, cross hatched areas can be utilized for area or region 512. A border similar to border 513 can be provided for region 512 having a matching color to the dots in the stippled area. In one embodiment, region 512 does not have a border. Precipitation levels of weather can be shown beneath regions 503 and 512 (e.g., regions 503 and 512 can be overlaid on other weather regions showing the underlying weather beneath the speckled areas). Region 512 can be inferred as a HAAT region on a downwind side of a high altitude, high conductivity cell.

In an alternative embodiment, the speckles of regions 503 and 512 are the same color. However, speckles for region 512 have a larger size to signify a HAAT condition as opposed to smaller speckles for a HAIC condition in one embodiment. In an alternative embodiment, a checkered pattern can be utilized for regions 503 and 512. With reference to FIGS. 5 and 6, regions 503 and 512 are shown on a radial-by-radial basis or cell-by-cell basis.

Figure 7:
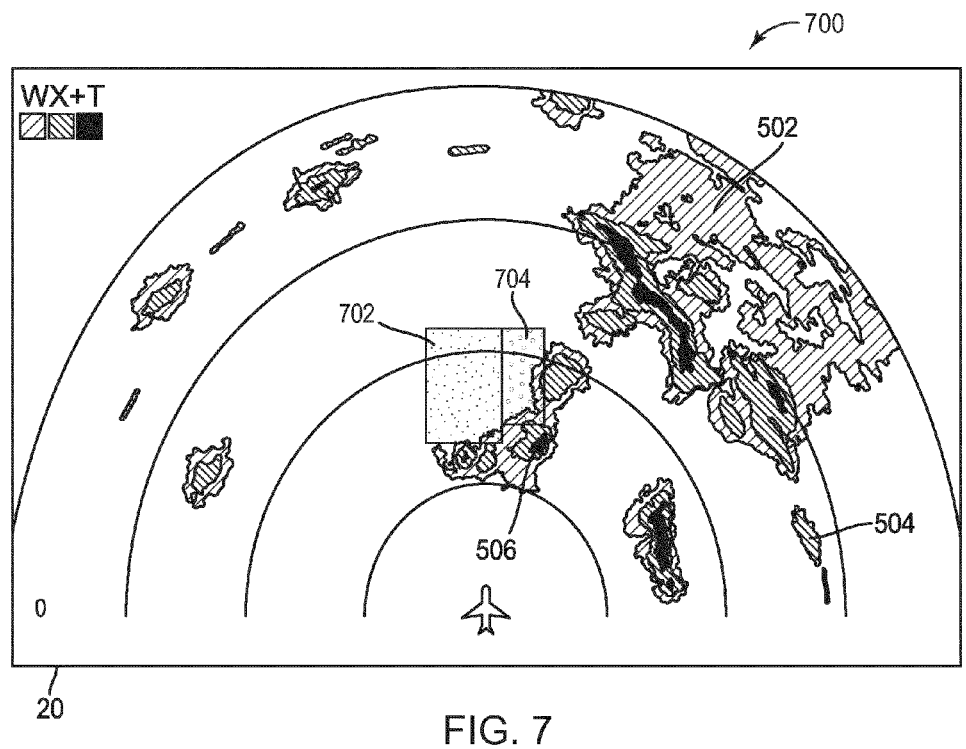
FIG. 7 is a schematic illustration of an aviation horizontal plan view weather display showing a HAIC warning and a HAAT warning, according to an exemplary embodiment.

With reference to FIG. 7, a region 702 indicating a HAIC condition is shown as a rectangular region correlated to its location on a display 700. As shown in FIG. 7, a region 704 associated with a HAAT condition is provided with a region 702 on display 700 in one embodiment. Speckles or dots of red in region 704 are aligned with and overwrite the speckles or dots of yellow in region 702 in one embodiment. The use of the rectangular shapes for regions 702 and 704 makes it easier to notice such regions. Precipitation levels of region 506 are viewable through regions 702 and 704 in one embodiment.

Figure 8:
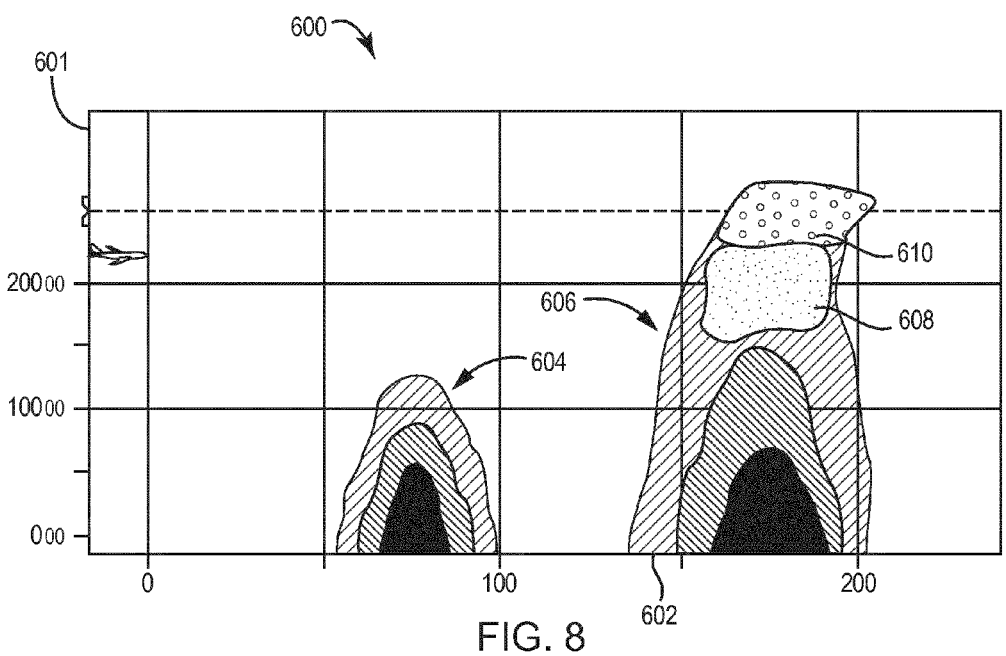
FIG. 8 is a schematic illustration of an aviation vertical view weather display showing a HAIC warning and a HAAT warning, according to an exemplary embodiment.

With reference to FIG. 8, displays 500, 550, and 700 can be utilized in conjunction with the display 600 of FIG. 8. Alternatively, FIG. 8 can be utilized by itself. Display 600 is a vertical display having altitude on an Y axis 601 and range on a X axis 602. Region 604 of weather does not include a region for HAIC condition or a region for a HAAT condition. However, region 606 of weather includes a region 608 corresponding to a HAIC condition and a region 610 indicating a HAAT condition. Vertical display 600 allows the pilot to view the altitude necessary to clear HAAT conditions and HAIC conditions. In the example of FIG. 8, display 600 is not correlated to displays 500, 550 or 700. However, display 600 can be correlated with displays 500, 550, or 700 according to vertical weather display operation with plan view displays.

In one embodiment, the density of speckles on any of displays 500, 550, 600 or 700 can have a density corresponding to the level of threat of the HAIC condition. Higher density of ice can correspond to higher density dots in regions 502 or 702 in one embodiment. Larger sizes of ice can correspond to higher density dots or speckles in regions 502 or 702 in one embodiment. The level of threat associated with HAAT conditions can be similarly displayed. Modules 334 and 340 can determine the level of threat. In one embodiment, the size of speckles on any of displays 500, 550, 600 or 700 can correspond to the level of threat of the HAIC condition.

In one embodiment, module 338 provides an overwriting scheme when weather regions and HAIC and HAAT conditions occur in the same area. Table 1 below provides an exemplary scheme.

TABLE 1

| Condition | Display | Weather Color | HAIC Condition | HAAT Condition |
|---|---|---|---|---|
| 1 | Solid Red | Red | Yes | Yes |
| 2 | Solid Yellow with Red Dots | Yellow | Yes | Yes |
| 3 | Solid Green with Red Dots | Green | Yes | Yes |
| 4 | Solid Red | Red | Yes | No |
| 5 | Solid Yellow | Yellow | Yes | No |
| 6 | Solid Green with Yellow Dots | Green | Yes | No |
| 7 | Solid Red | Red | No | Yes |
| 8 | Solid Yellow with Red Dots | Yellow | No | Yes |
| 9 | Solid Green with Red Dots | Green | No | Yes |
| 10 | Solid Red | Red | No | No |
| 11 | Solid Yellow | Yellow | No | No |
| 12 | Solid Green | Green | No | No |

In certain embodiments, condition 5 can be displayed using an indication similar to region 702 of the HAIC condition such as showing the region in a rectangular form. Alternatively, a cross hatching can be utilized to indicate the HAIC condition in a yellow weather region. Alternatively, a text or other symbol can be used.

Similarly, crosshatching, text, rectangular regions, (e.g., region 704), etc. can be used for conditions 1 and 7 when a HAAT condition is at a red weather region. In one embodiment, a rectangular region can be used for conditions 1-7 to show the presence of a HAAT condition or a HAIC condition.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

According to various exemplary embodiments, electronics 304 may be embodied as hardware and/or software. In exemplary embodiments where the processes are embodied as software, the processes may be executed as computer code on any processing or hardware architecture (e.g., a computing platform that can receive reflectivity data from a weather radar system) or in any weather radar system such as the WXR-2100 system available from Rockwell Collins, Inc. or an RDR-400 system available from Honeywell, Inc. The processes can be performed separately, simultaneously, sequentially or independently with respect to each other.

While the detailed drawings, specific examples, detailed algorithms and particular configurations given describe preferred and exemplary embodiments, they serve the purpose of illustration only. The inventions disclosed are not limited to the specific forms and equations shown. For example, the methods may be performed in any of a variety of sequence of steps or according to any of a variety of mathematical formulas. The hardware and software configurations shown and described may differ depending on the chosen performance characteristics and physical characteristics of the weather radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

Some embodiments within the scope of the present disclosure may include program products comprising machine-readable storage media for carrying or having machine-executable instructions or data structures stored thereon. Such machine-readable storage media can be any available media which can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general purpose computer, special purpose computer, or special purpose processing machine to perform a certain function or group of functions. Machine or computer-readable storage media, as referenced herein, do not include transitory media (i.e., signals in space).

What is claimed is:

1. An aircraft hazard warning system, comprising:
   a processing system configured to detect a high altitude ice crystal (HAIC) or high altitude ice crystal cloud ($HAIC^2$) condition and cause a warning of the HAIC or $HAIC^2$ condition to be displayed, wherein the HAIC or $HAIC^2$ warning is provided on a weather radar display such that weather regions in a same location as the HAIC or $HAIC^2$ warning are viewable on the weather radar display, the HAIC or $HAIC^2$ condition being detected using weather radar returns associated with a high altitude region, the weather radar returns being processed to detect the HAIC or $HAIC^2$ condition, wherein the weather regions are provided as a solid green region for precipitation levels below a first level, a solid yellow region for precipitation levels above the first level below a second level, and a solid red region for precipitation levels above a third level, wherein the HAIC or $HAIC^2$ warning is displayed as yellow dots or cross sectional lines on a weather region depicted as a solid green region, wherein the processing system detects a high altitude associated threat (HAAT) condition and wherein the weather radar display provides visual indicia according to the following table:

| Condition | Display | Weather Color | HAIC or $HAIC^2$ Condition | HAAT Condition |
|---|---|---|---|---|
| 1 | Solid Red | Red | Yes | Yes |
| 2 | Solid Yellow with Red Dots | Yellow | Yes | Yes |
| 3 | Solid Green with Red Dots | Green | Yes | Yes |
| 4 | Solid Red | Red | Yes | No |
| 5 | Solid Yellow | Yellow | Yes | No |
| 6 | Solid Green with Yellow Dots | Green | Yes | No |
| 7 | Solid Red | Red | No | Yes |
| 8 | Solid Yellow with Red Dots | Yellow | No | Yes |
| 9 | Solid Green with Red Dots | Green | No | Yes |
| 10 | Solid Red | Red | No | No |
| 11 | Solid Yellow | Yellow | No | No |
| 12 | Solid Green | Green | No | No. |

2. The aircraft hazard warning system of claim 1, wherein the warning of the HAIC or $HAIC^2$ condition is provided as a speckled region, a striped region, or a region with outlined contours.

3. The aircraft warning system of claim 1, wherein the warning of the HAIC or $HAIC^2$ condition is provided as a speckled region of a color indicating a lower level of hazard.

4. The aircraft warning system of claim 1, wherein the speckled region includes yellow dots.

5. The aircraft warning system of claim 1, wherein the HAAT condition is a lightning or hail condition.

6. The aircraft hazard warning system of claim 1, wherein the high altitude associated threat (HAAT) condition is a lightning condition.

7. The aircraft hazard warning system of claim 6, wherein the warning of the HAAT condition is displayed with a color symbolizing a higher threat level than the warning associated with the HAIC or $HAIC^2$ condition.

8. The aircraft hazard warning system of claim 1, wherein the warning is displayed using a rectangular shaped region whereby the rectangular shaped region enhances the ability to notice the warning.

9. The aircraft hazard warning system of claim 8, wherein the warning of the HAIC or $HAIC^2$ condition is provided corresponding to its size and location correlated on the weather radar display.

10. The aircraft hazard warning system of claim 9, wherein dots associated with a HAAT condition at the location overwrite dots associated with the HAIC condition at the location.

11. A method of providing a high altitude associated threat (HAAT) warning and one of at least a high altitude ice crystal (HAIC) or high altitude ice crystal cloud ($HAIC^2$) warning on an aircraft using an electronic processor, the method comprising:
    receiving radar reflectivity data and determining at least one of a HAIC or $HAIC^2$ condition exists;
    displaying the at least one of the HAIC or $HAIC^2$ warning of the HAIC or $HAIC^2$ condition over weather regions on a weather radar display, wherein the weather regions on the weather radar display are viewable when the at least one of the HAIC or $HAIC^2$ warning is displayed;
    determining the HAAT condition exists; and
    displaying the HAAT warning over weather regions on a weather radar display, wherein the weather regions on the weather radar display are viewable when HAAT warning is displayed, and wherein the HAIC or $HAIC^2$ warning is not viewable at locations where the HAAT warning is displayed, wherein the HAAT warning and HAIC or HAIC warnings are displayed according to the following table:

| Condition | Display | Weather Color | HAIC or $HAIC^2$ Condition | HAAT Condition |
|---|---|---|---|---|
| 1 | Solid Red | Red | Yes | Yes |
| 2 | Solid Yellow with Red Dots | Yellow | Yes | Yes |
| 3 | Solid Green with Red Dots | Green | Yes | Yes |
| 4 | Solid Red | Red | Yes | No |
| 5 | Solid Yellow | Yellow | Yes | No |
| 6 | Solid Green with Yellow Dots | Green | Yes | No |
| 7 | Solid Red | Red | No | Yes |
| 8 | Solid Yellow with Red Dots | Yellow | No | Yes |
| 9 | Solid Green with Red Dots | Green | No | Yes |
| 10 | Solid Red | Red | No | No |
| 11 | Solid Yellow | Yellow | No | No |
| 12 | Solid Green | Green | No | No. |

12. The method of claim 11, wherein the warning of the HAIC condition is provided on a weather radar display.

13. The method of claim 12, wherein the electronic processor is part of an avionic weather radar system.

14. The method of claim 12, wherein the warning of the HAIC condition is provided on a vertical display.

15. The method of claim 14, wherein the warning of the HAIC condition is provided on a plan view display.

16. The method of claim 15, wherein the warning of the HAIC condition is provided as a speckled region on the plan view display and the vertical display.

17. An aircraft weather radar system, comprising:
a radar antenna for receiving radar returns; and
means for determining a high altitude associated threat (HAAT) condition and at least one of a high altitude ice crystal (HAIC) or high altitude ice crystal cloud (HAIC$^2$) condition and providing a warning of the HAAT condition and at least one of the HAIC or HAIC$^2$ condition at least partially in response to the radar returns, wherein the means for determining performs one or more of the following to detect the presence:
a dual frequency process;
a dual polarization process;
an ice crystal shape determination process; or
a non-coherent integration and turbulence detection process; and
means for displaying the at least one of the HAIC or HAIC$^2$ warning over weather images, the at least one of the HAIC or HAIC$^2$ warning being visual indicia, wherein the means for displaying provides the HAAT warning and the HAIC or HAIC$^2$ warning according to the following table:

| Condition | Display | Weather Color | HAIC or HAIC$^2$ Condition | HAAT Condition |
|---|---|---|---|---|
| 1 | Solid Red | Red | Yes | Yes |
| 2 | Solid Yellow with Red Dots | Yellow | Yes | Yes |
| 3 | Solid Green with Red Dots | Green | Yes | Yes |
| 4 | Solid Red | Red | Yes | No |
| 5 | Solid Yellow | Yellow | Yes | No |
| 6 | Solid Green with Yellow Dots | Green | Yes | No |
| 7 | Solid Red | Red | No | Yes |
| 8 | Solid Yellow with Red Dots | Yellow | No | Yes |
| 9 | Solid Green with Red Dots | Green | No | Yes |
| 10 | Solid Red | Red | No | No |
| 11 | Solid Yellow | Yellow | No | No |
| 12 | Solid Green | Green | No | No. |

18. The weather radar system of claim 17 wherein the display means provides the warning of the HAIC condition as a stippled area, striped area or an outline.

19. The aircraft weather radar system of claim 17, wherein the (HAAT) condition is a lightning condition.

20. The aircraft weather radar system of claim 19, wherein the warning of the HAAT condition and the warning of the HAIC condition are provided as speckled regions, wherein the speckled regions have different colors.

* * * * *